(12) United States Patent
Kii et al.

(10) Patent No.: US 8,736,093 B2
(45) Date of Patent: May 27, 2014

(54) OUTPUT CONTROL APPARATUS AND OUTPUT CONTROL METHOD FOR WIND TURBINE

(71) Applicant: Mitsubishi Heavy Industries, Ltd., Tokyo (JP)

(72) Inventors: Tsutomu Kii, Tokyo (JP); Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 91 days.

(21) Appl. No.: 13/729,232

(22) Filed: Dec. 28, 2012

(65) Prior Publication Data

US 2013/0234436 A1 Sep. 12, 2013

Related U.S. Application Data

(63) Continuation of application No. PCT/JP2012/056021, filed on Mar. 8, 2012.

(51) Int. Cl.
*F03D 7/04* (2006.01)
(52) U.S. Cl.
USPC .......................................................... 290/44
(58) Field of Classification Search
None
See application file for complete search history.

(56) References Cited

U.S. PATENT DOCUMENTS

| 7,679,215 | B2 | 3/2010 | Delmerico et al. |
| 8,242,620 | B2 * | 8/2012 | Kikuchi et al. ................. 290/44 |
| 2003/0106726 | A1 * | 6/2003 | Yoshii ........................... 180/65.1 |
| 2009/0224540 | A1 * | 9/2009 | Becker ............................... 290/7 |
| 2010/0145533 | A1 | 6/2010 | Cardinal et al. |
| 2011/0001318 | A1 | 1/2011 | Nelson |

FOREIGN PATENT DOCUMENTS

| JP | 2004260929 A | 9/2004 |
| JP | 2005245183 A | 9/2005 |
| JP | 2006174694 A | 6/2006 |
| JP | 2010270758 A | 12/2010 |

OTHER PUBLICATIONS

Written Opinion on the International Searching Authority Report in English Language and in Japanese Language.
Decision to Grant as issued on Feb. 19, 2013 in corresponding Japanese Patent Application No. 2009-528003.

* cited by examiner

*Primary Examiner* — Tulsidas C Patel
*Assistant Examiner* — Sean Gugger
(74) *Attorney, Agent, or Firm* — Kanesaka Berner & Partners, LLP

(57) ABSTRACT

An output control apparatus for a wind turbine, including an output difference calculation unit; a maximum output rate setting unit; an output command value calculation unit; and an output control unit, wherein the maximum output rate setting unit is configured so that the larger an absolute value of the difference is, the higher the maximum output rate is set at least in a range that the absolute value of the difference is not greater a threshold value.

9 Claims, 8 Drawing Sheets

OUTPUT CONTROL APPARATUS AND OUTPUT CONTROL METHOD FOR WIND TURBINE

TECHNICAL FIELD

The present invention relates to a control unit and a control method for controlling output power (active power) of a wind turbine.

BACKGROUND ART

From a perspective of preserving the environment, wind turbine generators using wind power (a wind turbine) are becoming popular. In a wind turbine generator, kinetic energy of the wind is converted into rotational energy of a rotor and the rotational energy of the rotor is then converted into electric power by a generator. Normally, the wind turbine generator is connected to the grid and electric power generated in the wind turbine generator is supplied to the grid.

It is know that a frequency of the grid is determined based on a demand-supply balance of electric power. More specifically, when power generation exceeds power demand, the surplus energy is stored as kinetic energy in generators that are connected to the grid, hence increasing their rotational speed, i.e. the grid frequency. In contrast, when power demand exceeds power generation, kinetic energy is extracted from the generators to compensate for power shortage in the grid, hence decreasing the rotation speed of the generators, i.e. the grid frequency.

Therefore, some of the electric power plants operate to follow a change in the power demand (a load-follow operation) to maintain the overall demand-supply balance in the grid. The electric power plants that perform the load-follow operation are normally thermal power plants as it is relatively easy to control their output by adjusting an amount of fuel supply. In this manner, some of the thermal power plants function as an adjusting power for maintaining the demand-supply balance. In contrast, power plants such as nuclear power plants and hydraulic power plants are difficult to control output (output power) in a short period of time and thus, those power plants function as a base supply power for continuously supplying a constant amount of electric power.

Herein, if the proportion of the wind turbine generators that have significant power variations is high among the entire generators connected to the grid, the adjusting power by the thermal power plants may not be sufficient. Particularly, in the nighttime when the power demand is extremely low compared to the daytime, the output of the thermal power plants are already set near the minimum output and thus, it is difficult to handle an increase in the output of the wind turbine generators.

Therefore, in the case where the adjusting power of the grid (a reduction margin) is insufficient, an upper limit of the output of the wind turbine generators are, for instance, set by a command from an external dispatch center.

Although not directly related to setting of the output upper limit of the wind turbines, there are known methods for controlling a ramp rate of a wind farm together with a rate of change in output of power plants including the thermal power plants as the adjusting power (see Patent Literatures 1 to 3). This method controls the ramp rate of the wind farm to the rate of change on the grid side as it is difficult to rapidly change the output of the power plants including the thermal power plants being the adjusting power in response to sudden change in the output of the wind farm due to wind conditions.

CITATION LIST

Patent Literature

PTL 1

US 2010/0145533 A

PTL 2

U.S. Pat. No. 7,679,215 B

PTL 3

US 2011/0001318 A

SUMMARY

Technical Problem

When studying methods for controlling output of the wind turbine with set upper limit of the output, the present inventors originally developed the logic shown in FIG. 10.

In the logic shown in FIG. 10, an output command value $P_0^*$ is obtained by a PI controller 142 in accordance with a difference between a present rotation speed $\omega_g$ of a generator and a target rotation speed $\omega_g^*$. The output command value $P_0^*$ is inputted to an output command value calculation unit 144. Further, maximum output $P_{max}$ and minimum output $P_{min}$ corresponding to a target value $\beta^*$ of a pitch angle of the wind turbine blade are inputted from an output controller 146 to the output command value calculation unit 144 and an output command value $P^*$ is set in a range of $P_{max}$ to $P_{min}$. Further, a past output command value $P^*_{past}$ is also inputted to the output command value calculation unit 144 from a past output command value update unit 145.

Further, the maximum output rate is inputted from a maximum output rate setting unit 110 to the output command value calculation unit 144 and the rate of change of the output of the wind turbine is restricted to at most the maximum output rate. The maximum output rate includes two types of rate, $V_{constant1}$ and $V_{constant2}$. $V_{constant1}$ is a fixed increase rate used when the output upper limit $P_{limit}$ is equal to or above the present value P of the output of the wind turbine. $V_{constant2}$ is a fixed decrease rate used when the output upper limit $P_{limit}$ is below the present value P of the output of the wind turbine. Both $V_{constant1}$ and $V_{constant2}$ have fixed values. When the difference $X_{present}$ ($=P_{limit}-P$) is zero or above where $P_{limit}$ is an output upper limit and P is a present value of the output, the fixed increase rate $V_{constant1}$ is inputted as the maximum output rate to the output command value calculation unit 144 from the maximum output rate setting unit 110. In contrast, when the difference $X_{present}$ smaller than zero, the fixed decrease rate $V_{constant2}$ is inputted as the maximum output rate to the output command value calculation unit 144 from the maximum output rate setting unit 110. In the output command value calculation unit 144, the present value of the output command value $P_0^*$ is calculated so that the output rate $V^*$ does not exceed the maximum output rate. The output rate $V^*$ is obtained from a previous value $P^*_{past}$ and a present value $P_0^*$ of the output command inputted from the past output command value update unit 145. The output command value P* obtained in the above manner is sent to an output control unit 149 via the CCU 148 for use in controlling by the output control unit 149.

From the standpoint of power producers owning wind turbines, it is desired to improve profitability by increasing the present value P of the output as high as possible under the restriction that the output of the wind turbine is suppressed not to exceed the output upper limit $P_{limit}$. To achieve this, it is preferable to bring the present value P of the output quickly to a neighborhood of the output upper limit $P_{limit}$ while suppressing overshoot or undershoot of the present value P of the output with respect to the output upper limit $P_{limit}$.

However, in the logic shown in FIG. 10, the maximum output rate that is set by the maximum output rate setting unit 110 regulates the rate of change of the output using the fixed maximum output rate $V_{constant1}$ or $V_{constant2}$ regardless of the difference between the output upper limit $P_{limit}$ and the current value P of the output of the wind turbine. Therefore, it is difficult to bring the present value P quickly to the output upper limit $P_{limit}$ while suppressing the overshoot and undershoot of the output with respect to the output upper limit.

More specifically, in the logic shown in FIG. 10, in an attempt to prevent the present value P of the output from overshooting or undershooting with respect to the output upper limit $P_{limit}$, the fixed output rate $V_{constant1}$ or $V_{constant2}$ is reduced. As a result, it takes a lot of time till the present value P reaches the output upper limit $P_{limit}$ and electricity production does not increase, resulting in decline of the profitability. Similarly, in an attempt to shorten the time for the present value P to reach the output upper limit $P_{limit}$, overshoot or undershoot of the output with respect to the output upper limit $P_{limit}$ could take place beyond an allowable range.

In view of the above issues, it is an object of the present invention is to provide an output control unit for a wind turbine and a method of controlling the output of the wind turbine, which are capable of suppressing overshooting or undershooting of the output with respect to the output upper limit and also allowing the output of the wind turbine to reach the neighborhood of the output upper limit.

Solution to Problem

According to embodiments of the present invention, an output control apparatus for a wind turbine comprises:

an output difference calculation unit for calculating a difference between output and an output upper limit of the wind turbine;

a maximum output rate setting unit for setting a maximum output rate of the wind turbine in accordance with the difference;

an output command value calculation unit for calculating an output command value of the wind turbine so that a rate of change of the output does not exceed the maximum output rate; and an output control unit for controlling the output of the wind turbine based on the output command value, wherein the maximum output rate setting unit is configured so that the larger an absolute value of the difference is, the higher the maximum output rate is set at least in a range that the absolute value of the difference is not greater a threshold value.

Further, the output upper limit may be set independently by a control unit installed to the wind turbine, or may be set by a remote command center outside the wind turbine, such as a dispatch center.

According to the above output control apparatus for the wind turbine, the larger the absolute value of the difference is between the output upper limit and the output, the higher the maximum output rate for regulating the rate of change is set. As a result, it is possible to bring the output quickly to the neighborhood of the output upper limit while suppressing overshoot or undershoot.

More specifically, in the case where the difference between the output of the wind turbine and the output upper limit is large and the overshoot or undershoot is less likely to take place, it is possible to bring the output to the neighborhood of the output upper limit faster by using a relatively high maximum output rate. Further, in the case where the difference between the output of the wind turbine and the output upper limit is small and the overshoot or undershoot is likely to take place, it is possible to prevent the output from overshooting and undershooting the output upper limit by using a relatively low maximum output rate.

Further, to prevent the output from overshooting and undershooting the output upper limit means to keep the overshoot amount and undershoot amount of the output with respect to the output upper limit within the allowable range, and does not require completely preventing the overshoot and undershooting.

According to one embodiment, the above output control apparatus further comprises:

a lookup table representing a relationship between the difference and the maximum output rate, the lookup table being used for setting the maximum output rate by the maximum output rate setting unit; and a table update unit for updating the lookup table based on overshoot amount or an undershoot amount of the output with respect to the output upper limit.

Responsive characteristics of hardware forming the wind turbine (the generator, an inverter, etc.) normally vary due to individual variability and thus, optimum content of the lookup table used for setting the maximum output rate by the maximum output rate setting unit varies according to wind turbines. Therefore, the lookup table is updated by the table update unit based on the overshoot amount or the undershoot amount of the output with respect to the output upper limit so that the content of the lookup table is appropriate for each wind turbine. Further, even in the case where the responsive characteristic of the hardware changes with time, it is possible to update the content of the lookup table appropriately to follow the change in the responsive characteristic of the hardware.

In the case of updating the lookup table by the table update unit in the above manner, the table update unit may update the maximum output rate corresponding to a past value $X_{past}$ of the difference from V to $|X_{past}| \times V/\Delta X$ in the lookup table when $\Delta X > |X_{present}|$, where $X_{present}$ is a present value of the difference, $\Delta X$ is an absolute value of a change amount from the past value $X_{past}$ to the present value $X_{present}$, $|X_{past}|$ is an absolute value of the past value $X_{past}$, $|X_{present}|$ is an absolute value of the present value $X_{present}$, and V is the maximum output rate corresponding to the past value $X_{past}$. When $\Delta X > |X_{present}|$, it means that overshoot or undershoot took place and $\Delta X$ equals to a sum of the absolute value $|X_{present}|$ of the present value of the difference and the absolute value $|X_{past}|$ of the past value of the difference.

When the overshoot or the undershoot takes place as described above, the maximum output rate corresponding to the past value $X_{past}$ of the difference is updated from V to $|X_{past}| \times V/\Delta X$, thereby updating the lookup table appropriately. As a result, the overshoot and undershoot can be effectively prevented from the next time.

In the case of updating the lookup table by the table update unit in the above manner, the lookup table may comprise an increase table used when the output is below the output upper limit, and a decrease table used when the output exceeds the output upper limit, and the maximum output rate corresponding to the difference may be lower in the increase table than the decrease table.

In some cases, the constraint of keeping the output of the wind turbine to or below the output upper limit is given priority over the desire to maximize the output of the wind turbine. For instance, the output upper limit that is set according to the command from the dispatch center outside the wind turbine when the adjusting power of the grid (a reduction margin) is insufficient is for a public purpose of maintaining the power supply/demand balance in the grid. Therefore, compared to the desired to increase power generation for a personal purpose of improving profitability of power producers, the constraint of keeping the output of the wind turbine to or below the output upper limit is sometimes given more importance.

In this case, by providing the increase table and the decrease table in the lookup table and setting the maximum output rate of the increase table below the maximum output rate of the decrease table as described above, keeping the output at or below the output upper limit is given more importance over reaching the neighborhood of the output upper limit fast.

In the case of setting the maximum output rate of the increase table below the maximum output rate of the decrease table, the table update unit may be configured to update the maximum output rate corresponding to a past value $X_{past}$ of the difference from V to a value smaller than $|X_{past}| \times V/\Delta X$ in the increase table when $\Delta X > |X_{present}|$ and $X_{present} < 0$, where $X_{present}$ is a present value of the difference, $\Delta X$ is an absolute value of a change amount from the past value $X_{past}$ to the present value $X_{present}$, $|X_{past}|$ is an absolute value of the past difference $X_{past}$, $|X_{present}|$ is an absolute value of the present value $X_{present}$, and V is the maximum output rate corresponding to the past value $X_{past}$.

As a result, even in the case where responsive characteristics of hardware forming the wind turbine (the generator, an inverter, etc.) vary due to individual variability, the content of the increase table can be appropriate for each wind turbine by updating the increase table appropriately. Further, even in the case where the responsive characteristic of the hardware changes with time, it is possible to update the content of the increase table appropriately to follow the change in the responsive characteristic of the hardware. Further, when $\Delta X > |X_{present}|$ and $X_{present} < 0$ (i.e. the overshoot), the maximum output rate corresponding to the past value $X_{past}$ of the difference is updated from V to the value smaller than $|X_{past}| \times V/\Delta X$. As a result, the overshoot and undershoot can be effectively prevented from the next time.

Further, in the case of updating the lookup table by the table update unit in the above manner, the above output control apparatus may further comprise:

an abnormality determination unit for determining whether or not there are abnormalities in the wind turbine based on a number of times that the table update unit updates the lookup table.

For instance, when the number of times the lookup table is updated exceeds expectation, it is assumed that there are abnormalities in the wind turbine (sudden deterioration or damage beyond expectation). By providing the abnormality determination unit for determining abnormalities in the wind turbine based on the number of times that the table update unit updates the lookup table (the number of times that the table update unit updates the lookup table), it is possible to monitor the condition of the wind turbine.

Furthermore, in the case of updating the lookup table by the table update unit in the above manner, the above output control apparatus may further comprise:

an abnormality determination unit for determining whether or not there are abnormalities in the wind turbine based on a temporal change of the overshoot amount or the undershoot amount.

For instance, when the overshot amount or the undershoot amount increases abruptly, it is assumed that there are abnormalities in the wind turbine (sudden deterioration or damage beyond expectation). By providing the abnormality determination unit for determining abnormalities in the wind turbine based on the temporal change of the overshoot amount or the undershoot amount, it is possible to monitor the condition of the wind turbine.

In another embodiment, the output difference calculation unit is configured to calculate a difference between the output and the upper outer-power limit of an entirety of a plurality of the wind turbines belonging to a wind farm, the maximum output rate setting unit is configured to set the maximum output rate of the entirety of the plurality of the wind turbines belonging to the wind farm in accordance with the difference, the output command value calculation unit is configured to calculate the output command value of the entirety of the plurality of the wind turbines belonging to the wind farm, and the output control unit is configured to control the output of the entirety of the plurality of the wind turbines belonging to the wind farm wind turbine based on the output command value.

By controlling the output of the wind turbines belonging to the same wind farm by means of the output control apparatus, it is possible to bring the output of the entire wind farm to the neighborhood of the output upper limit fast while suppressing the overshoot and undershoot of the output of the entire wind farm.

According to an embodiment of the present invention, a method of controlling output of a wind turbine comprises the steps of:

calculating a difference between the output and an output upper limit of the wind turbine;

setting a maximum output rate of the wind turbine in accordance with the difference;

calculating an output command value of the wind turbine so that a rate of change of the output does not exceed the maximum output rate; and controlling the output of the wind turbine based on the output command value, and in the step of setting the maximum output rate, the larger an absolute value of the difference is, the higher the maximum output rate is set at least in a range that the absolute value of the difference is not greater than a threshold value.

According to the above method, the larger the absolute value of the difference is between the output upper limit and the output, the higher the maximum output rate for regulating the rate of change is set. As a result, it is possible to bring the output close to the neighborhood of the output upper limit fast while suppressing overshoot or undershoot.

More specifically, in the case where the difference between the output of the wind turbine and the output upper limit is large and the overshoot or undershoot is less likely to take place, it is possible to bring the output to the neighborhood of the output upper limit faster by using a relatively high maximum output rate. Further, in the case where the difference between the output of the wind turbine and the output upper limit is small and the overshoot or undershoot is likely to take place, it is possible to prevent the output from overshooting and undershooting the output upper limit by using a relatively low maximum output rate.

Advantageous Effects of Invention

According to the present invention, the larger the absolute value of the difference between the output and the output upper limit of the wind turbine is, the higher the maximum output rate for regulating the rate of change of the output of the wind turbine is set and thus, it is possible to bring the output of the wind turbine to the neighborhood of the output upper limit fast.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

Figure 1:
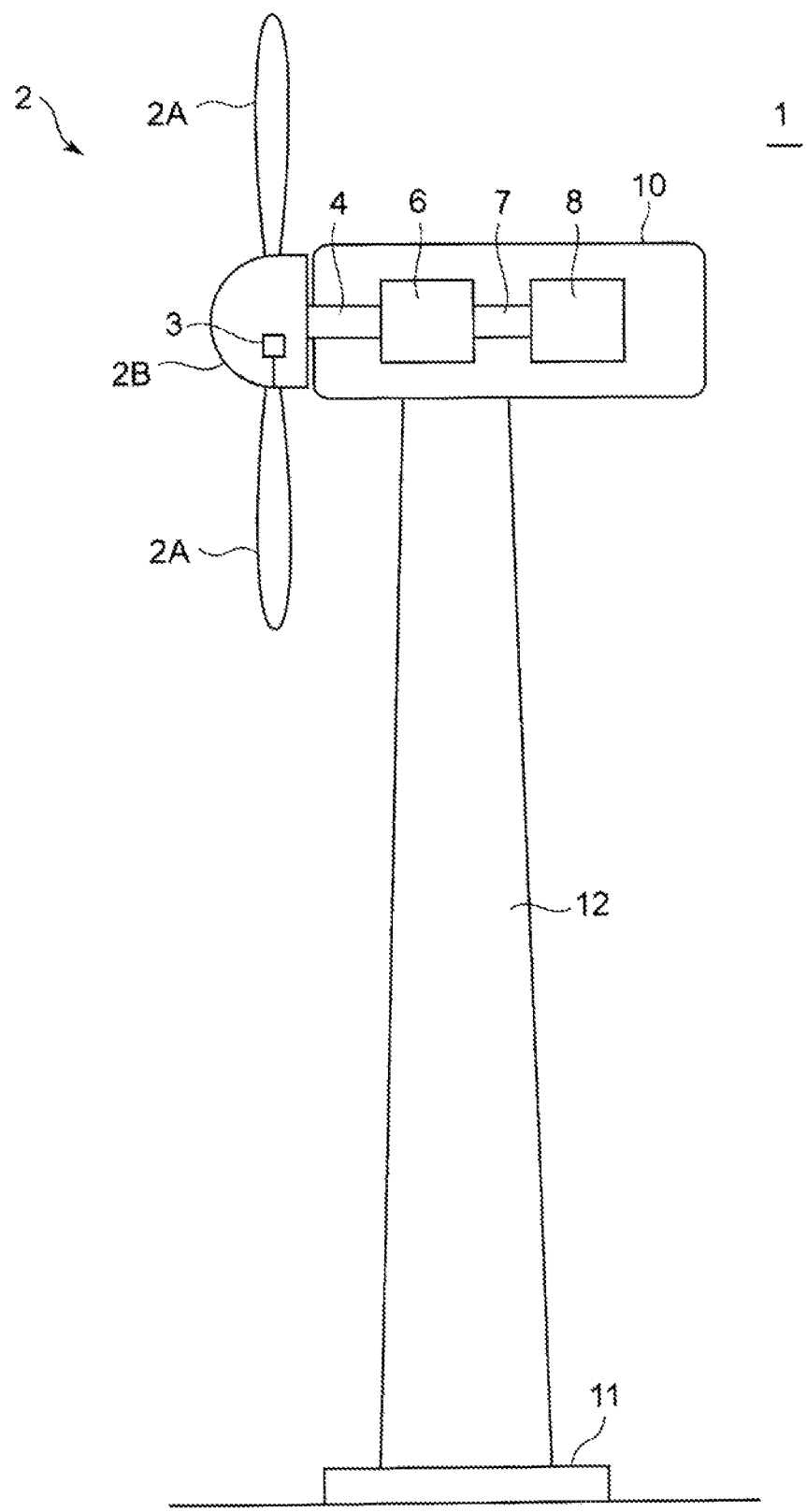
FIG. 1 is an illustration of an example of a general structure of a wind turbine generator.

FIG. 1 is an illustration of an example of a general structure of a wind turbine generator. As shown in the drawing, the wind turbine generator 1 is provided mainly with a rotor 2 rotatable upon receiving the wind, a main shaft 4 connected to the rotor 2, a gear box (step-up gear) 6 for increasing a rotation speed of the main shaft 4 and a generator 8 connected to an output shaft 7 of the gear box 6.

The rotor 2 is configured such that at least one blade 2A is attached to a hub 2B. The main shaft 4 is connected to the hub 2B. When the entire rotor 2 is rotated by a force of the wind received by the blade 2A, the rotation of the rotor 2 is inputted to the gear box 6 via the main shaft 4. The generator 8 is connected to the output shaft 7 of the gear box 6 and mechanical energy from the output shaft 7 of the gear box 6 is converted into electric energy (active power). The generator 8 is connected to the grid 14 (see FIG. 2) so as to supply the active power produced by the generator to the grid 14.

In another embodiment, the generator 8 may be directly connected to the main shaft 4 without the gear box 6 or may be connected to the main shaft 4 via a hydraulic transmission, instead of the gear box 6, to increase the rotation speed of the main shaft 4 and input the increased rotation speed to the generator 8.

To the blade 2A, an actuator 3 is attached. The actuator 3 operates under control of a pitch control unit 32 (see FIG. 2) to control the pitch angle of each blade 2A.

The gear box 6 and the generator 8 are housed in a nacelle 10. The nacelle 10 is supported by a tower 12 installed in a standing manner on a foundation 11. The wind turbine generator 1 may be installed in any place including onshore and offshore.

Figure 2:
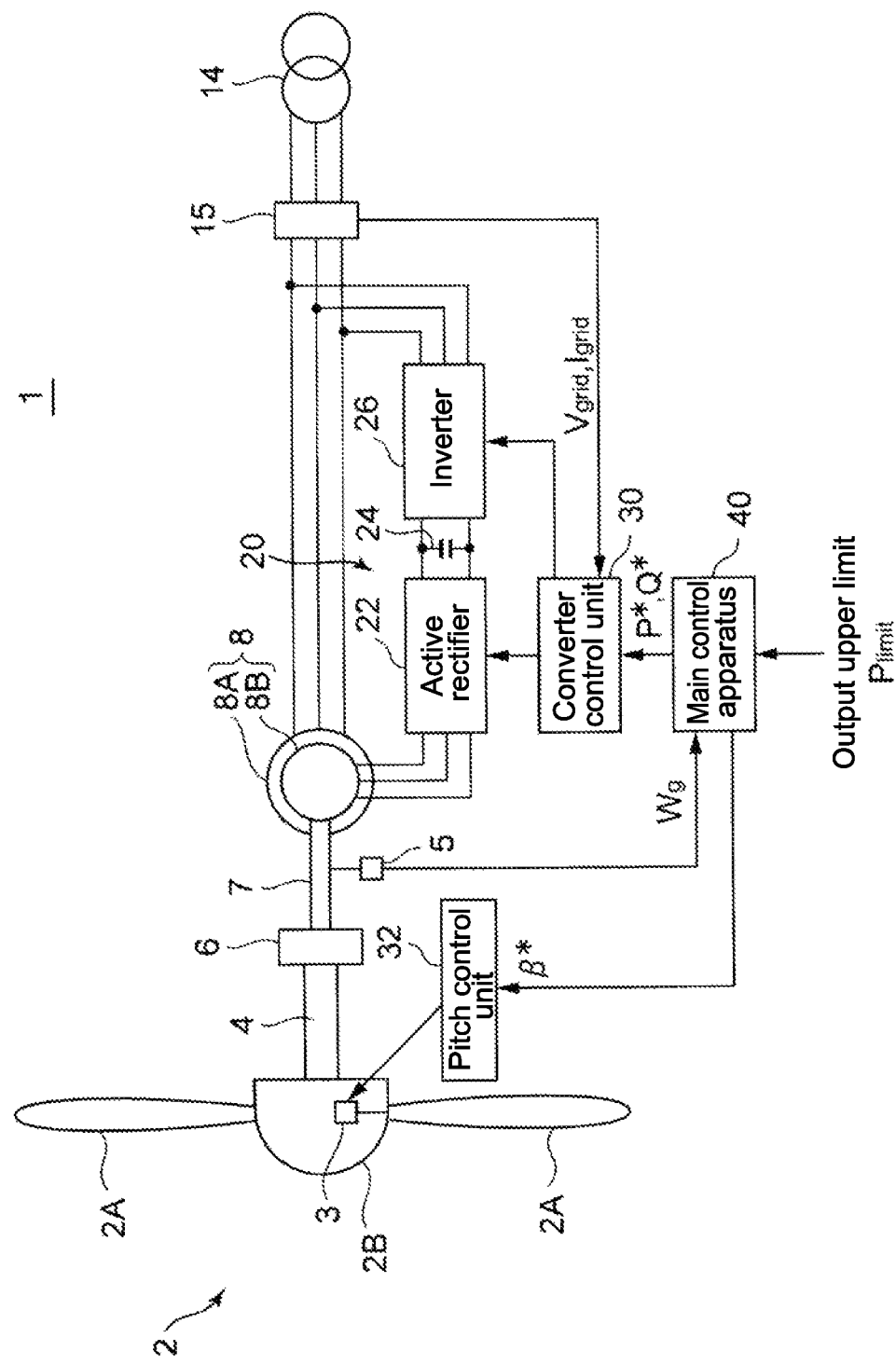
FIG. 2 is an illustration of a structure example of the wind turbine generator according to an embodiment.

FIG. 2 is an illustration of a structure example of the wind turbine generator according to an embodiment. In this embodiment, the wind turbine generator is a doubly-fed variable speed wind turbine. However, the wind turbine generator 1 is not limited to this and may be other types of wind turbine.

For instance, the wind turbine generator 1 may be a direct drive type in which a multipolar synchronous generator is directly connected to the main shaft 4 without the gear box 6 and the synchronous generator is connected to the grid 14 via AC-DC-AC link. Further, the wind turbine generator 1 may be a hydraulic drive type in which a hydraulic transmission with a combination of variable hydraulic pump, hydraulic motor is provided, instead of the gear box 6, between the main shaft 4 and the synchronous generator and the synchronous generator directly connected to the hydraulic motor is directly connected to the grid.

In the example shown in FIG. 2, the generator 8 is a wound-rotor induction generator having a stator winding 8A and a rotor winding 8B. The stator winding 8A is directly connected to the grid 14, whereas the rotor winding 8B is configured to rotate with the output shaft 7 of the gear box 6 and connected to the grid 14 via the AC-DC-AC converter 20.

The AC-DC-AC converter 2— is formed by an active rectifier 22, a DC bus and an inverter 26. The active rectifier 22 converts AC power generated in the rotor winding 8B into DC power and outputs the DC power to the DC bus 24. The inverter 26 receives the DC power from the DC bus 24 and converts it to DC power of frequency that matches the grid 14 and outputs the DC power to the grid 14.

The active rectifier 22 and the inverter 26 operate in accordance with a PWM signal from a converter control unit 30. The converter control unit 30 produces the PWM signal supplied to the active rectifier 22 and the inverter 26, in accordance with the command value P* of the active power and a command value Q* of reactive power that are supplied from a main control apparatus 40. More specifically, the converter control unit 30 calculates based on a measured electric voltage $V_{grid}$ and a measured electric current $I_{grid}$ of the electric power supplied to the grid 14 from the generator 8, the command value P* of the active power and the command value Q* of reactive power that are outputted to the grid 14, the measured electric voltage $V_{grid}$ and the measured electric current $I_{grid}$ being measured by a voltage/current sensor 15. Then, the converter control unit 30 supplies the active rectifier 22 and the inverter 26 with the PWM signal corresponding to a difference between the command value P* of the active power and the command value Q* of reactive power from the main control apparatus 40 and the active power P and the reactive power Q. In this manner, a feedback control is performed to bring the active power P and the reactive power Q supplied to the grid 14 closer to the command value P* of the active power and the command value Q* of reactive power that are set by the main control apparatus 40.

The command value P* of the active power and the command value Q* of reactive power is determined by the main control apparatus 40, for instance, based on the output upper limit $P_{limit}$ set by an external dispatch center outside the wind turbine and the rotation speed $\omega_g$ of the generator 8 measured by a rotation speed sensor 5. The rotation speed sensor 5 is not particularly limited as long as it is capable of measuring the rotation speed $\omega_g$ of the generator 8 (the rotation speed of the output shaft 7). For instance, a rotary encoder and a resolver may be used as the rotation speed sensor 5.

Further, the main control apparatus 40 also functions to supply a command value $\beta^*$ of the pitch angle of the blade 2A to the pitch control unit 32.

Figure 3:
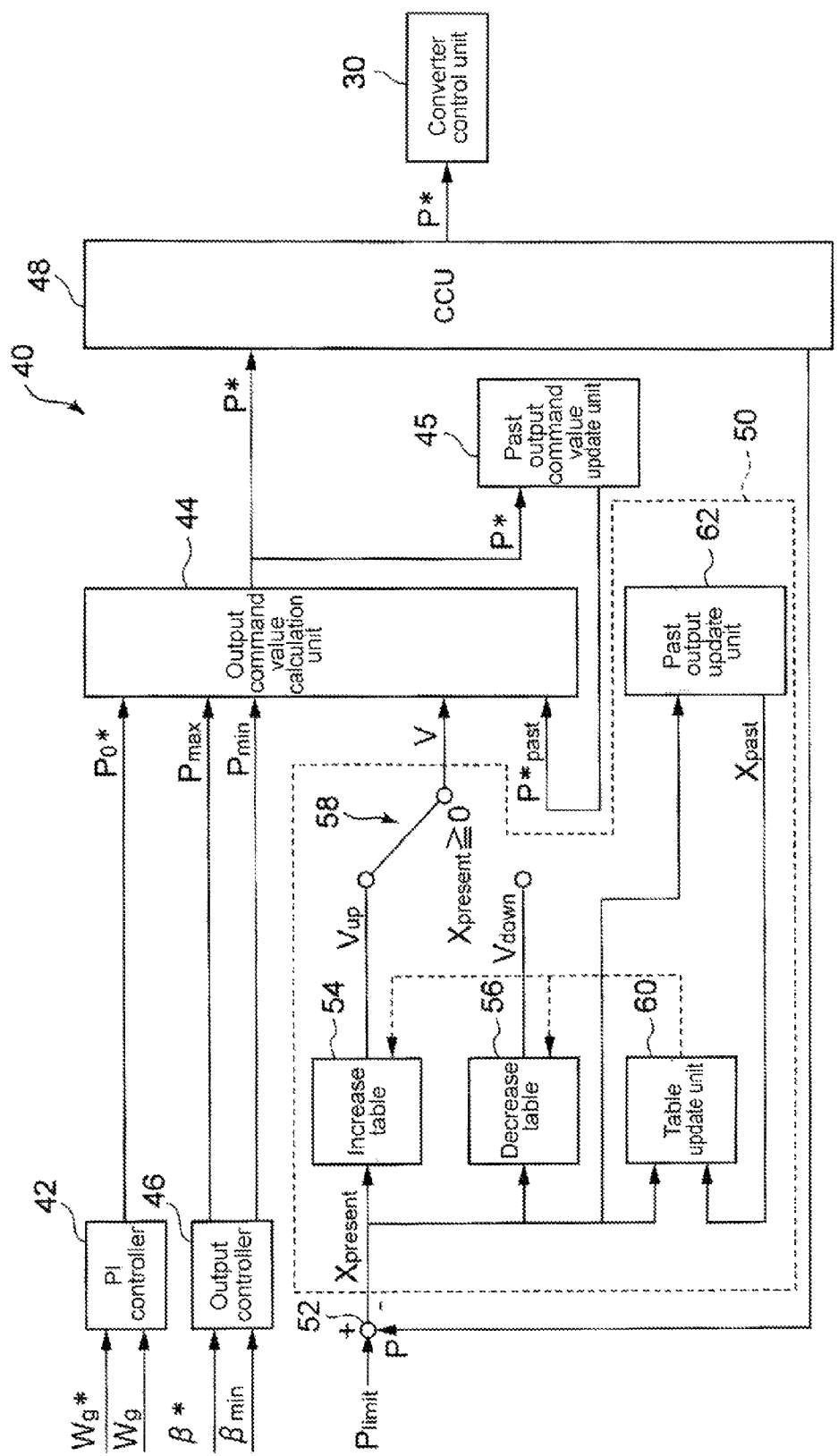
FIG. 3 is a block diagram illustrating logic for calculating an active power command value P*.

FIG. 3 is a block diagram illustrating logic for calculating the active power command value $P^*$ by the main control apparatus 40. In this embodiment, the main control apparatus 40 and the converter control unit 30 functioning as the output control unit together are equivalent to an output control apparatus of the wind turbine.

In the logic shown in FIG. 3, the output command value $P_0^*$ corresponding to the difference between the present value $\omega_g$ and the target value $\omega_g^*$ of the rotation speed of the generator is obtained in the PI controller 42 and then the obtained output command value $P_0^*$ is inputted to an output command value calculation unit 44. Further, the target value $\omega_g^*$ of the rotation speed of the generator 8 may be determined based on at least the output upper limit $P_{limit}$ of the wind turbine generator 1. For instance, until the output of the wind turbine reaches the output upper limit $P_{limit}$, the target value $\omega_g^*$ of the rotation speed may be set in accordance with the wind speed so that a tip speed ratio of the rotor 2 is approximately the optimum tip speed ratio and once the output of the wind turbine reaches the output upper limit $P_{limit}$, the target value $\omega_g^*$ of the rotation speed may be set to achieve the output upper limit $P_{limit}$.

To the output command value calculation unit 44, the maximum output $P_{max}$ and the minimum output $P_{min}$ are inputted from an output controller 46, and an output command value $P^*$ is restricted in a range of $P_{max}$ to $P_{min}$. Further, the maximum output and the minimum output $P_{min}$ are set arbitrarily in accordance with a state of the wind turbine generator 1 (the target value $\beta^*$ of the pitch angle of the blade 2A). Furthermore, the minimum target value $\beta_{min}$ used for setting $P_{max}$ and $P_{min}$ along with the target value $\beta^*$ of the pitch angle is a limit value of the blade 2A on a fine position to achieve a maximum power coefficient of the rotor 2.

Further, a past output command value $P^*_{past}$ is also inputted to the output command value calculation unit 44 from a past output command value update unit 45. In the past output command value update unit 45, the present output command value $P^*$ obtained in the output command value calculation unit 44 is stored as the past output command value $P^*_{past}$, and this past output command value $P^*_{past}$ is used in the next calculation step by the output command value calculation unit 44. Further, the past output command value $P^*_{past}$ is updated for each control cycle of the main control apparatus 40.

To the output command value calculation unit 44, the maximum output rate V is inputted from a maximum output rate setting unit 50, and the rate of change of the output of the wind turbine (the rate of change of the output command value $P^*$) is set to or below the maximum output rate V.

More specifically, the rate of change $V^*$ of the output to be achieved (the rate of change of the output command value $P^*$) is calculated by dividing by the control cycle of the main control apparatus 40 the difference between the output command value $P_0^*$ from the PI controller 42 and the past output command value $P^*_{past}$ from the past output command value update unit 45. If the rate of change $V^*$ is equal to or below the maximum output rate V, the output command value $P_0^*$ from the PI controller 42 is used as the present output command value $P^*$ (the output command value $P_0^*$ is in the rage of $P_{min}$ to $P_{max}$). If the rate of change $V^*$ exceeds the maximum output rate V, a sum of the past output command value $P^*_{past}$ and the maximum output rate V multiplied by the control cycle is used as the present output command value $P^*$.

For instance, where the past output command value $P^*_{past}$ is 1400 kW, the output command value $P_0^*$ generated in the PI controller 42 is 1500 kW, the maximum output $P_{max}$ generated in an output controller 46 is 2000 kW, the minimum output $P_{min}$ is 1000 kW, the maximum output rate V is 100 kW/sec, and the control cycle is 50 msec, the present output command value $P^*$ is determined in the following manner.

The output command value $P_0^*$ generated in the PI controller 42 is 1500 kW and thus below the maximum output $P_{max}$ generated in the output controller 46 and equal to or above the minimum output $P_{min}$. Hence, the rate of change $V^*$ to be achieved is 2000 kW/sec (=(1500 kW−1400 kW)/50 msec). This rate of change $V^*$ is greater than the maximum output rate V (=100 kW/sec) and thus, instead of using the output command value $P_0^*$ as the present output command value $P^*$, the sum of the past output command value $P^*_{past}$ and the maximum output rate V multiplied by the control cycle, 1405 kW (=1400 kW/sec×50 msec) is used as the present output command value $P^*$.

The maximum output rate setting unit 50 sets the maximum output rate V having the value corresponding to a difference $X_{present}$ between the present value P of the output (the present value of the active electric power supplied to the grid 14) and the output upper limit $P_{limit}$. More specifically, in the maximum output rate setting unit 50, the larger an absolute value of the difference $X_{present}$ is, the higher the maximum output rate is set at least in a range that the absolute value of the difference $X_{present}$ is equal to or below a prescribed threshold value.

The maximum output rate setting unit 50 may set the maximum output rate V corresponding to the difference $X_{present}$ using a lookup table representing a relationship between the difference $X_{present}$ and the maximum output rate V. In this case, two types of lookup table, i.e. an increase table 54 and a decrease table 56 as shown in FIG. 3, may be provided. The increase table 54 is used when the present value P of the output is below the output upper limit $P_{limit}$, whereas the decrease table 56 is used when the present value P of the output exceeds the output upper limit $P_{limit}$.

As shown in FIG. 3, a table update unit 60 may be provided in the maximum output rate setting unit 50 so as to update the lookup table (the increase table 54 and the decrease table 56) based on an overshoot amount or an undershoot amount of the present value P with respect to the output upper limit $P_{limit}$.

Responsive characteristics of hardware forming the wind turbine generator 1 (the generator 8, the AC-DC-AC converter 20 and the like) normally vary due to individual difference and thus, the optimum content of the lookup table (the increase table 54 and the decrease table 56) varies according to wind turbines. Therefore, the lookup table is updated by the table update unit 60 based on the overshoot amount or the undershoot amount of the present value P of the output with respect to the output upper limit $P_{limit}$ so that the content of the lookup table is appropriate for each wind turbine. Further, even in the case where the responsive characteristic of the hardware changes with time, it is possible to update the content of the lookup table appropriately to follow the change in the responsive characteristic of the hardware.

Figure 5:
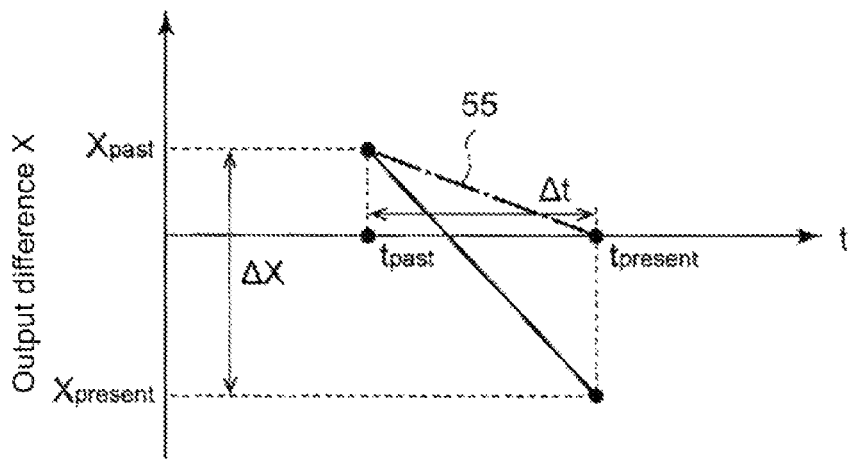
FIG. 5 is a graph illustrating updating of the increase table by a table update unit.
Figure 6:
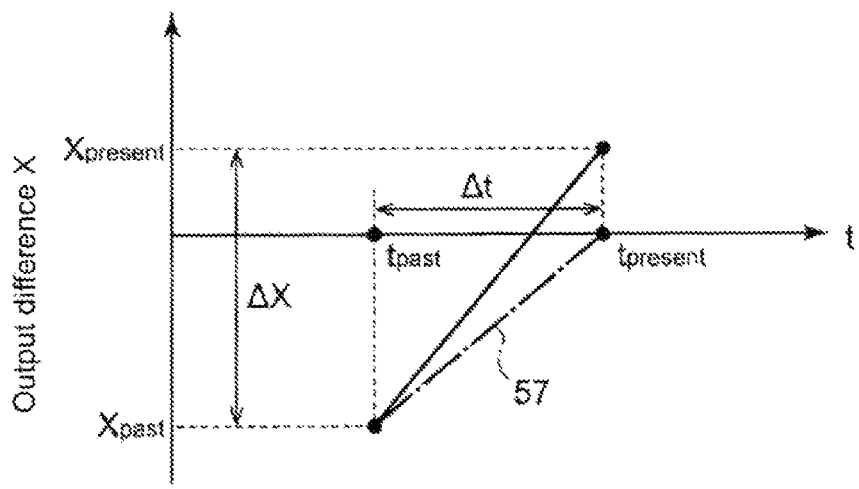
FIG. 6 is a graph illustrating updating of the decrease table by the table update unit.

The lookup table may be updated using the overshoot amount or the undershoot amount itself, or may be updated using any parameter which reflects the overshoot amount or the undershoot amount (e.g. $\Delta X$ and $X_{past}$ shown in FIG. 5 and FIG. 6). The table update unit 60 may update the lookup table automatically when a certain condition is met or may update the lookup table using as a trigger a table update command inputted by an operator via an arbitrary user interface. In the latter case, the lookup table may be updated according to update content instructed by the operator.

In an embodiment, as shown in FIG. 3, the maximum output rate setting unit 50 may be formed by the increase table 54, the decrease table 56, a selector 58, the table update unit 60 and a past output update unit 62.

To this maximum output rate setting unit 50, the difference obtained from subtracting the present value P of the output from the output upper limit $P_{limit}$, $X_{present}$ (the present value of the difference in the output) is inputted from a subtractor 52. More specifically, the difference $X_{present}$ is inputted to the lookup table (the increase table 54 and the decrease table 56) and $V_{up}$, $V_{down}$ corresponding to the difference $X_{present}$ is outputted from each table 54, 56. Then, the selector 58 selects $V_{up}$ outputted from the increase table 54 when the difference $X_{present}$ is zero or above ($P_{limit} \geq 0$ and the maximum output rate $V_{up}$ is inputted to the output command value calculation unit 44. In contrast, when the difference $X_{present}$ is less than zero ($P_{limit}<P$), the selector 58 selects $V_{down}$ outputted from the decrease table 56 as the maximum output rate V and this maximum output rate $V_{down}$ is inputted to the output command value calculation unit 44. Further, the difference $X_{present}$ obtained in the subtractor 52 is also inputted to the table update unit 60 to be used with the past value $X_{past}$ of the difference inputted from the past output update unit 62 for updating the lookup table (the increase table 54 and the decrease table 56).

Figure 4:
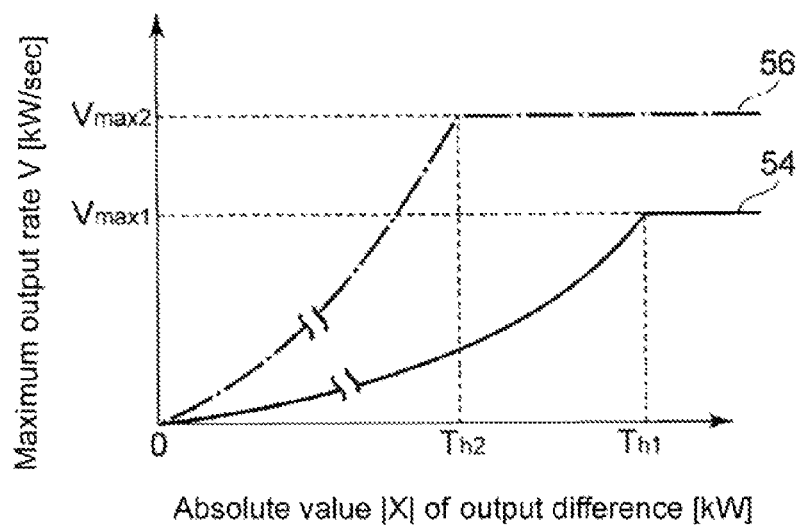
FIG. 4 is a graph showing an example of an increase table and a decrease table.

FIG. 4 is a graph illustrating an example of the increase table 54 and the decrease table 56. As shown in the drawing, the increase table 54 and the decrease table 56 are both configured so that, in a range that the absolute value |X| of the difference obtained by subtracting the present value P of the output from the output upper limit $P_{limit}$ is equal to or below a prescribed threshold value $T_{h1}$, $T_{h2}$, the larger an absolute value |X| of the difference is, the higher the maximum output rate V is set. In other words, in the range that the absolute value |X| of the difference is equal to or below the prescribed threshold value $T_{h1}$, $T_{h2}$, the maximum output rates V of the increase table 54 and the decrease table 56 are both defined as a function V(X) which monotonically increases with respect to the absolute value |X|. Herein, the maximum output rate V of the increase table 54 used when the difference X is zero or above ($P_{limit}>0$) means an upper value of an output increase rate [kW/sec]. Similarly, the maximum output rate V of the decrease table 56 used when the difference X is less than zero ($P_{limit}<0$) means an upper value of an output decrease rate [kW/sec].

In the range that the absolute value |X| of the difference is greater than the prescribed threshold value $T_{h1}$, $T_{h2}$, the maximum output rate of each table 54, 56 may be a constant rate $V_{max1}$, $V_{max2}$.

As shown in FIG. 4, the value of the maximum output rate V(X) indicated by the increase table 54 may be lower than the maximum output rate V(X) indicated by the decrease table 56.

The constraint of keeping the output P of the wind turbine at or below the output upper limit $P_{limit}$ is given priority in some cases over the desire to maximize the output P of the wind turbine. In this case, by setting the maximum output rate of the increase table 54 below the maximum output rate of the decrease table 56 as described above, keeping the output P at or below the output upper limit $P_{limit}$ is given more importance over rapidly reaching the neighborhood of the output upper limit $P_{limit}$.

FIG. 5 is a graph illustrating updating of the increase table 54 by the table update unit 60.

The case illustrated in FIG. 5 is when the difference between the output upper limit $P_{limit}$ and the present value P of the output is above zero ($X_{past}>0$) at a time $t_{past}$ and then the difference $X_{present}$ becomes less than zero at a time $t_{present}$ after the control cycle $\Delta T$ from the time $t_{past}$. In this case, it is thought that the maximum output rate $V(X_{past})$ corresponding to the past difference $X_{past}$ in the increase table 54 was too high and thus the overshoot took place. Therefore, to prevent the overshoot from the next time, the maximum output rate corresponding to the past difference $X_{past}$ in the increase table 54 is updated by the table update unit 60 from $V(X_{past})$ to $V(X_{past}) \times |X_{past}|/\Delta X$. Meanwhile, the maximum output rate V, in the increase table, corresponding to the absolute value |X| of the difference before and after the past difference $X_{past}$ may be updated as well so as to maintain continuity of the function V(X) of the increase table 54.

Further, a line indicated as 55 in FIG. 5 is a hypothetical line representing the change of the difference X of the output in a hypothetical case of restricting the rate of change of the output at the time $t_{past}$ by the maximum output rate (=$V(X_{past}) \times |X_{past}|/\Delta X$) defined by the updated increase table 54. From the line 55, it is understood that it is possible in principle to prevent the overshoot from the next time by updating the increase table 54 as described above.

Furthermore, in another embodiment, the maximum output rate corresponding to the past difference $X_{past}$ in the increase table 54 may be updated by the table unit 60 from $V(X_{past})$ to $V_{new}(>0)$ which is smaller than $V(X_{past}) \times |X_{past}|/\Delta X$. As a result, it is possible to prevent the overshoot more effectively from the next time.

FIG. 6 is a graph illustrating updating of the decrease table 56 by the table update unit 60.

The case illustrated in FIG. 6 is when the difference between the output upper limit $P_{limit}$ and the present value P of the output is less than zero ($X_{past}<0$) at the time $t_{past}$ and then the difference $X_{present}$ becomes above zero at the time $t_{present}$ after the control cycle $\Delta T$ from the time $t_{past}$. In this case, it is thought that the maximum output rate $V(X_{past})$ corresponding to the past difference $X_{past}$ in the decrease table 56 was too high and thus undershoot took place. Therefore, to prevent the undershoot from the next time, the maximum output rate corresponding to the past difference $X_{past}$ in the decrease table 56 is updated by the table update unit 60 from $V(X_{past})$ to $V(X_{past}) \times |X_{past} P \Delta X$. Meanwhile, the maximum output rate V of the decrease table 56 corresponding to the absolute value |X| of the difference before and after the past difference $X_{past}$ may be updated in the decrease table 56 as well so as to maintain continuity of the function V(X) of the decrease table 56.

Further, a line indicated as 57 in FIG. 6 is a hypothetical line representing the change of the difference X of the output in a hypothetical case of restricting the rate of change of the output at the time $t_{past}$ by the maximum output rate (=$V(X_{past}) \times |X_{past}|/\Delta X$) defined by the updated decrease table 56. From the line 57, it is understood that it is possible in principle to prevent undershoot from the next time forward by updating the decrease table 56 as described above.

Furthermore, in another embodiment, the maximum output rate corresponding to the past difference $X_{past}$ in the decrease table 56 may be updated by the table unit 60 from $V(X_{past})$ to $V_{new}(<V(X_{past}))$ which is greater than $V(X_{past}) \times$ $|X_{past}|/\Delta X$. As a result, it is possible to prevent the overshoot more effectively from the next time.

Figure 7:
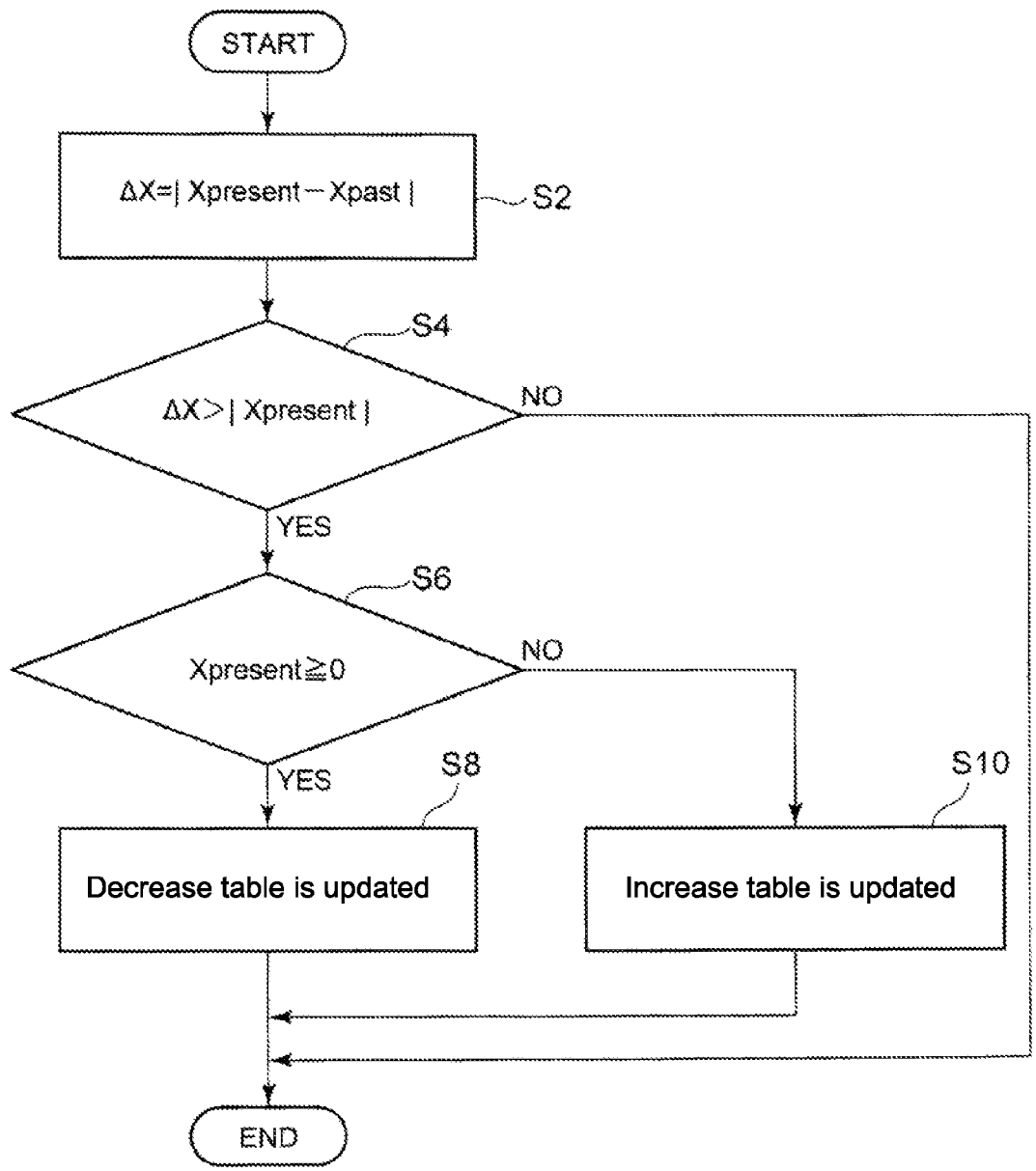
FIG. 7 is a flow chart showing a process of updating a lookup table by the table update unit.

FIG. 7 is a flow chart showing a process of updating the lookup table by the table update unit 60.

As shown in FIG. 7, in a step S2, the absolute value of a change amount from the past value $X_{past}$ to the present value $X_{present}$, $\Delta X$ ($=|X_{present}-X_{past}|$) is obtained. The past difference $X_{past}$ is a difference between the output upper limit $P_{limit}$ outputted from the past output update unit 62. The present value $X_{present}$ is a difference between the output upper limit $P_{limit}$ outputted from the subtractor 52 and the present value P of the output. Next, in a step S4, the absolute value of the change amount, $\Delta X$ is compared to the absolute value of the present difference, $|X_{present}|$.

If it is determined that the absolute value of the change amount, $\Delta X$ is greater than the absolute value of the present difference, $|X_{present}|$ (YES in the step S4), this indicates that the output of the wind turbine (active electric power) P overshot or undershot the output upper limit $P_{limit}$ in a period between $t_{past}$ and $t_{present}$. To prevent the overshoot or undershoot for the next time, the lookup table is updated in a step S6 and later. If it is determined that the absolute value of the change amount, $\Delta X$ is equal to or below the absolute value of the present difference, $|X_{present}|$ (NO in the step S4), this indicates that no overshoot or undershoot took place. In this case, it is not necessary to update the lookup table.

In a step S6, it is determined if the present difference $X_{present}$ is zero or greater. If the present difference $X_{present}$ is zero or greater, this indicates that the output of the wind turbine (active electric power) P undershot the output upper limit $P_{limit}$ in the period between $t_{past}$ and $t_{present}$. To prevent the undershoot from the next time, the decrease table 56 is updated in a step S8. In this case, the maximum output rate corresponding to the past difference $X_{past}$ may be updated in the decrease table 56 from $V(X_{past})$ to $V(X_{past}) \times |X_{past}|/\Delta X$ (see the line 57 of FIG. 6). In another embodiment, the maximum output rate corresponding to the past difference $X_{past}$ in the decrease table 56 may be updated from $V(X_{past})$ to $V_{new}$ ($<V(X_{past})$) which is greater than $V(X_{past}) \times |X_{past}|/\Delta X$.

In contrast, if it is determined in the step S6 that the present difference $X_{present}$ is less than zero, this indicates that the output of the wind turbine (active electric power) P overshot the output upper limit $P_{limit}$ in the period between $t_{past}$ and $t_{present}$. To prevent the overshoot from the next time, the increase table 54 is updated in a step S10. In this case, the maximum output rate corresponding to the past difference $X_{past}$ may be updated in the increase table 54 from $V(X_{past})$ to $V(X_{past}) \times |X_{past}|/\Delta X$ (see the line 55 of FIG. 5). In another embodiment, the maximum output rate corresponding to the past difference $X_{past}$ in the increase table 54 may be updated from $V(X_{past})$ to $V_{new}$ ($>0$) which is smaller than $V(X_{past}) \times |X_{past}|/\Delta X$.

As described above, the output control apparatus (combination of the main control apparatus 40 and the converter control unit 30) for the wind turbine according to the embodiments is provided with:

an output difference calculation unit (the subtractor 52) for calculating the difference $X_{present}$ between the present output P and the output upper limit $P_{limit}$ of the wind turbine generator 1;

the maximum output rate setting unit 50 for setting the maximum output rate V in accordance with the difference $X_{present}$;

the output command value calculation unit 44 for calculating the output command value P* so that the rate of change of the output does not exceed the maximum output rate V; and an output control unit (the converter control unit 30) for controlling the output of the wind turbine based on the output command value P*.

The maximum output rate setting unit 50 is configured so that the larger an absolute value of the difference $X_{present}$ is, the higher the maximum output rate V is set at least in a range that the absolute value of the difference $X_{present}$ is not greater the threshold value $T_{h1}$, $T_{h2}$.

According to the embodiments, the larger the absolute value of the difference $X_{present}$ is between the output upper limit $P_{limit}$ and the output P, the higher the maximum output rate V is set. As a result, it is possible to bring the output quickly to the neighborhood of the output upper limit $P_{limit}$ while suppressing overshoot or undershoot.

More specifically, in the case where the difference between the output P of the wind turbine and the output upper limit $P_{limit}$ is large and the overshoot or undershoot is less likely to take place, it is possible to bring the output to the neighborhood of the output upper limit $P_{limit}$ faster by using a relatively high maximum output rate V. Further, in the case where the difference between the output P of the wind turbine and the output upper limit $P_{limit}$ is small and the overshoot or undershoot is likely to take place, it is possible to prevent the output P from overshooting and undershooting the output upper limit $P_{limit}$ by using a relatively low maximum output rate V.

Figure 8:
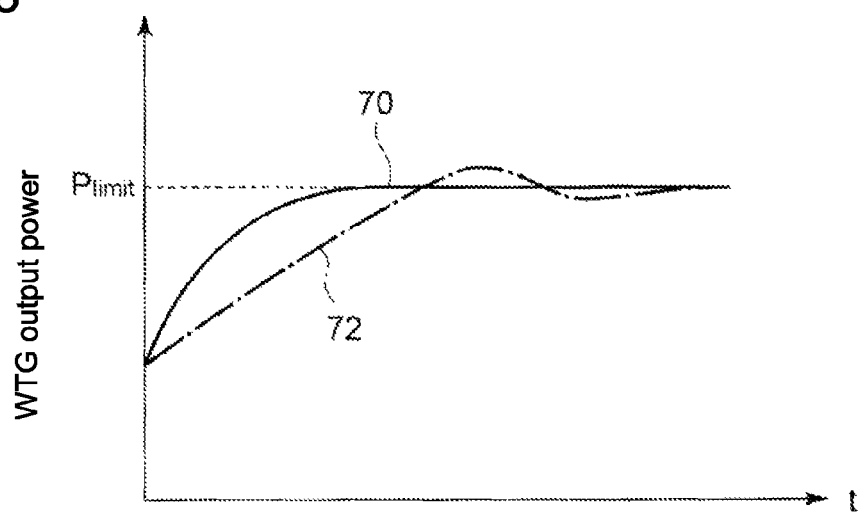
FIG. 8 is a graph illustrating controlling of the output of the wind turbine according to another embodiment.

FIG. 8 is a graph illustrating controlling of the output of the wind turbine according to this embodiment. In this embodiment, in the case where the difference between the output P of the wind turbine and the output upper limit $P_{limit}$ is large, the maximum output rate V is set comparatively high so as to bring the output of the wind turbine to the neighborhood of the output upper limit $P_{limit}$ faster (see a curve 70). Further, in the case where the difference between the output P of the wind turbine and the output upper limit $P_{limit}$ is small, the maximum output rate V is set comparatively low so as to prevent the overshoot and undershoot of the output with respect to the output upper limit $P_{limit}$ (see a curve 70). The shape of the curve 70 is not limited to the above description and temporal change of the output of the wind turbine may be expressed by any curve other than the curve 70.

Figure 10:
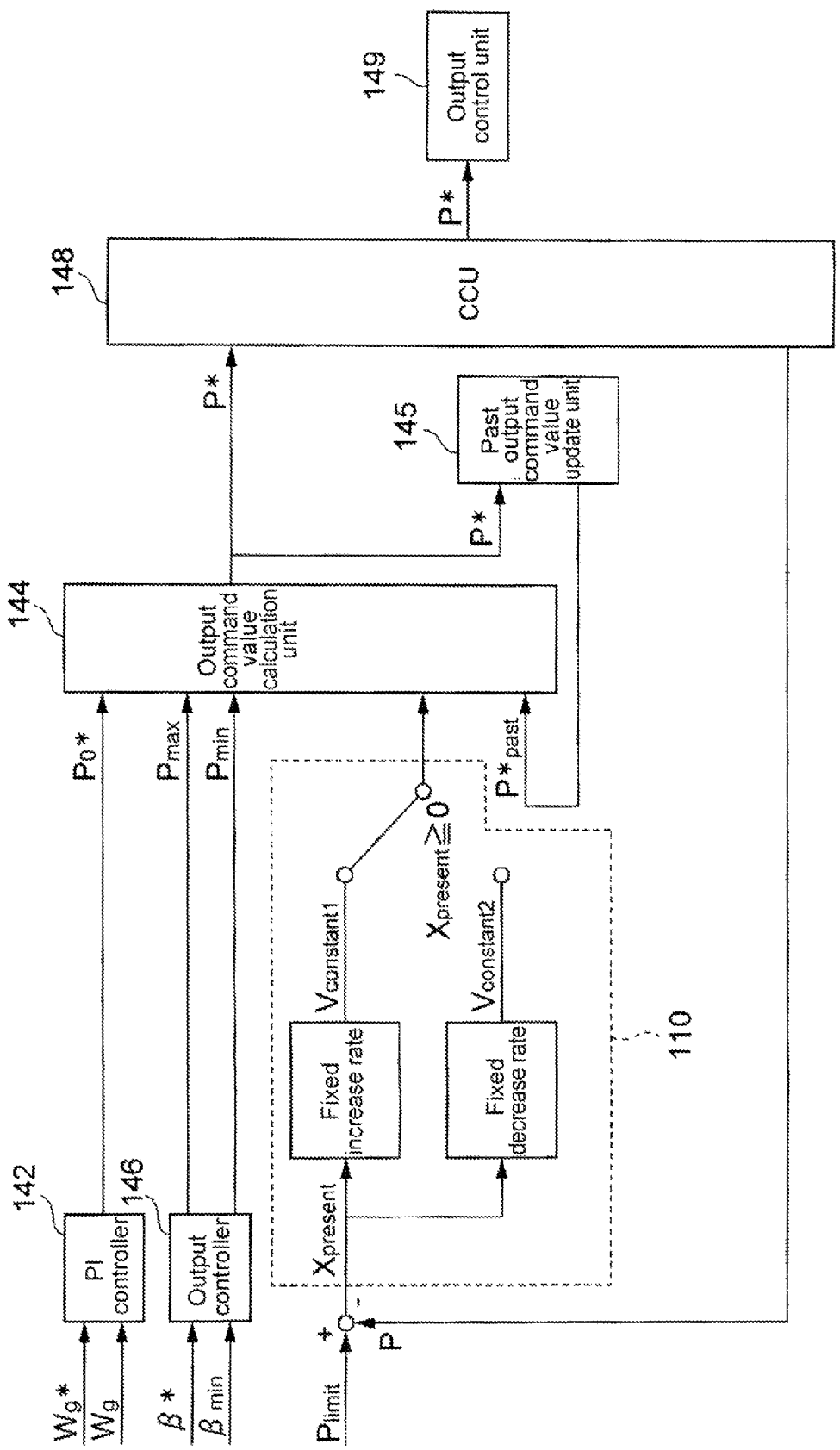
FIG. 10 is a block diagram showing logic for controlling the output in the case where the output upper limit of the wind turbine is set.

On the other hand, in the case where the maximum output rate V is fixed regardless of the value of the difference between the output P and the output upper limit $P_{limit}$ as shown in FIG. 10, a relatively low output upper limit $P_{limit}$ must be used to keep the overshoot amount and the undershoot amount of the output of the wind turbine with respect to the output upper limit $P_{limit}$ within a permissible range and it takes much longer to reach the neighborhood of the output upper limit $P_{limit}$ (see a curve 72).

While the present invention has been described with reference to embodiments, it is obvious to those skilled in the art that various changes may be made without departing from the scope of the invention.

For instance, in the above embodiments, described is the output control apparatus for a single wind turbine generator 1. However, the present invention is not limited to this and the output control apparatus may be used for controlling a total output of more than one wind turbine belonging to a wind farm.

In this case, the difference $X_{present}$ between the output upper limit $P_{limit}$ and the output P of an entirety of the wind turbines belonging to the wind farm, is obtained by the subtractor (the output difference calculation unit) 52, and the maximum output rate of the entirety of the wind turbines belonging to the wind farm is set in accordance with the difference by the maximum output rate setting unit 50. The output command value P* of the entirety of the wind turbines (the total output command value) is calculated and different output command values are given to the converter control units (the output control unit) 30 of the wind turbines individually so as to achieve the total output command value P*. The output command values may be calculated by dividing the total output command value P* by the number of the wind turbines, N.

Further, in the above embodiment, an abnormality determination unit for detecting abnormalities in the wind turbine generator 1 may be additionally provided.

Figure 9:
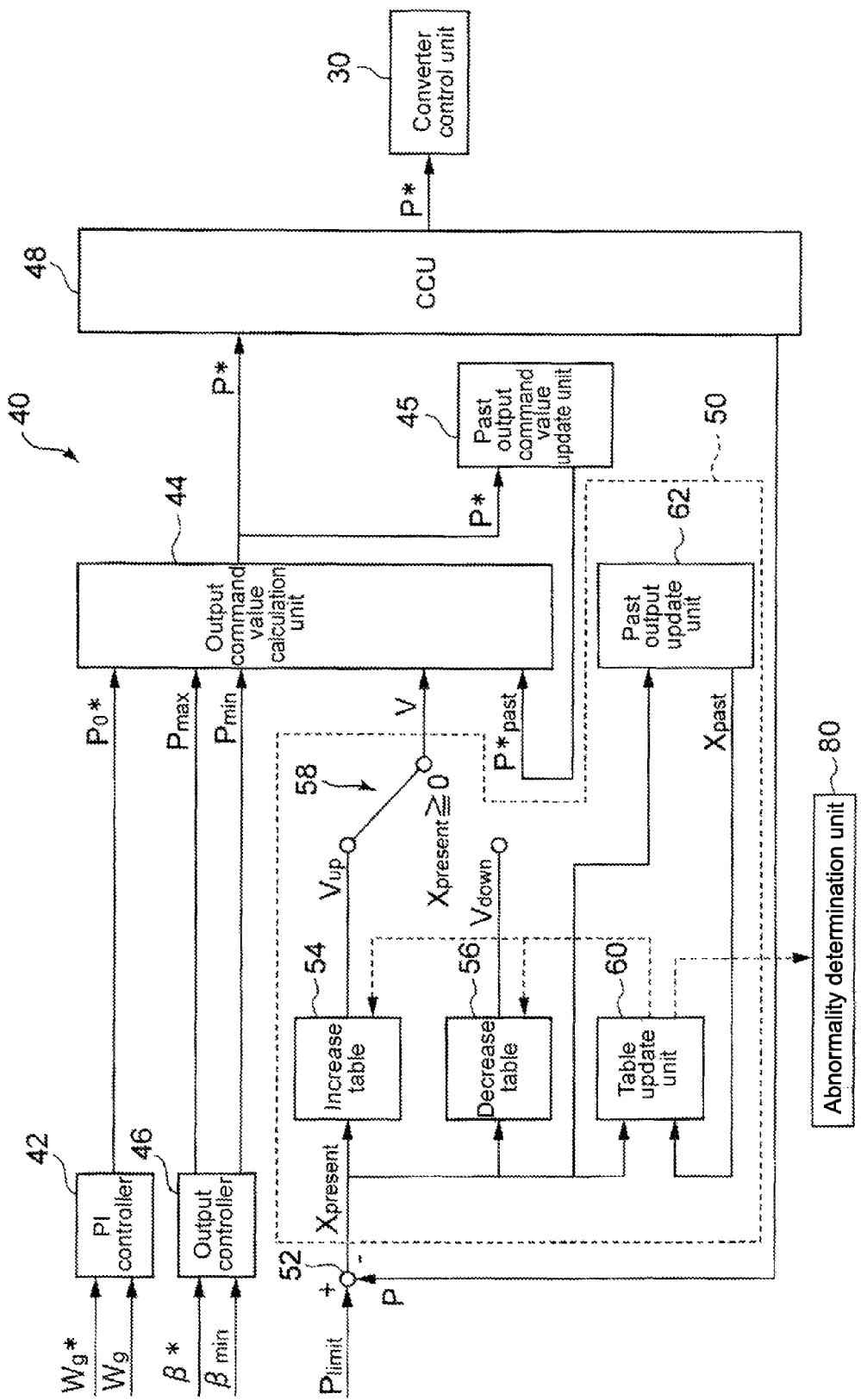
FIG. 9 is an illustration of an output control apparatus of the wind turbine equipped with an abnormality determination unit.

FIG. 9 is an illustration of the output control apparatus of the wind turbine equipped with the abnormality determination unit. The output control apparatus of FIG. 9 is equivalent to the output control apparatus of FIG. 3 additionally provided with the abnormality determination unit 80. Thus, the same reference numerals are given without adding explanations for those configurations that are the same as the output control apparatus shown in FIG. 3 and herein the abnormality determination unit 80 is described.

The abnormality determination unit 80 may determine whether or not there are abnormalities in the wind turbine based on at least one of the number of times that the lookup table is updated (the number of times that the table update unit updates the lookup table) and temporal change of the overshoot amount or the undershoot amount.

For instance, the abnormality determination unit 80 may detect abnormalities in the wind turbine by determining whether the number of times the lookup table is updated (the number of times that the table update unit updates the lookup table) exceeds a prescribed threshold value based on information regarding the number of times received from the table update unit 60. When the number of times the lookup table is updated exceeds expectation, it is assumed that there are abnormalities in the wind turbine (sudden deterioration or damage beyond expectation). Thus, it is possible to monitor the condition of the wind turbine by determining whether or not there are abnormalities in the wind turbine based on the number of times that the lookup table is updated (the number of times that the table update unit updates the lookup table).

Alternatively, the abnormality determination unit 80 may detect abnormalities in the wind turbine by determining whether the overshoot amount or the undershoot amount of a prescribed period of time exceeds a prescribed threshold value based on information regarding the temporal change of the overshoot amount or the undershot amount received from the table update unit 60. When the overshot amount or the undershoot amount increases abruptly, it is assumed that there are abnormalities in the wind turbine (sudden deterioration or damage beyond expectation). Thus, it is possible to monitor the condition of the wind turbine by determining whether or not there are abnormalities in the wind turbine based on the number of times that the lookup table is updated (the number of times that the table update unit updates the lookup table). Thus, it is possible to monitor the condition of the wind turbine with the abnormality determination unit provided for determining whether or not there are abnormalities in the wind turbine based on the information regarding the temporal change of the overshoot amount or the undershoot amount.

REFERENCE SIGNS LIST

1 WIND TURBINE GENERATOR (WIND TURBINE)
2 ROTOR
2A BLADE
2B HUB
3 ACTUATOR
4 MAIN SHAFT
5 ROTATION SPEED SENSOR
6 GEAR BOX
7 OUTPUT SHAFT
8 GENERATOR
8A STATOR WINDING
8B ROTATOR WINDING
10 NACELLE
11 FOUNDATION
12 TOWER
14 GRID
15 VOLTAGE/CURRENT SENSOR
20 AC-DC-AC CONVERTER
22 ACTIVE RECTIFIER
24 DC BUS
26 INVERTER
30 CONVERTER CONTROL UNIT
32 PITCH CONTROL UNIT
40 MAIN CONTROL APPARATUS
42 PI CONTROLLER
44 OUTPUT COMMAND VALUE CALCULATION UNIT
45 PAST OUTPUT COMMAND VALUE UPDATE UNIT
46 OUTPUT CONTROLLER
48 CCU
50 MAXIMUM OUTPUT RATE SETTING UNIT
52 SUBTRACTOR
54 INCREASE TABLE
56 DECREASE TABLE
58 SELECTOR
60 TABLE UPDATE UNIT
62 PAST OUTPUT COMNAND VALUE UPDATE UNIT
80 ABNORMALITY DETERMINATION UNIT
110 MAXIMUM OUTPUT RATE SETTING UNIT
142 PI CONTROLLER
144 OUTPUT COMMAND VALUE CALCULATION UNIT
145 PAST OUTPUT COMMAND VALUE UPDATE UNIT
146 OUTPUT CONTROLLER
148 CCU
149 OUTPUT CONTROL UNIT

The invention claimed is:

1. An output control apparatus for a wind turbine, comprising:
    an output difference calculation unit for calculating a difference between output and an output upper limit of the wind turbine;
    a maximum output rate setting unit for setting a maximum output rate of the wind turbine in accordance with the difference;
    an output command value calculation unit for calculating an output command value of the wind turbine so that a rate of change of the output does not exceed the maximum output rate; and
    an output control unit for controlling the output of the wind turbine based on the output command value,
    wherein the maximum output rate setting unit is configured so that the larger an absolute value of the difference is, the higher the maximum output rate is set at least in a range that the absolute value of the difference is not greater a threshold value.

2. The output control apparatus according to claim 1, further comprising:
    a lookup table representing a relationship between the difference and the maximum output rate, the lookup table being used for setting the maximum output rate by the maximum output rate setting unit; and a table update unit for updating the lookup table based on overshoot amount or an undershoot amount of the output with respect to the output upper limit.

3. The output control apparatus according to claim 2, wherein, the table update unit is configured to update the maximum output rate corresponding to a past value $X_{past}$ of the difference from V to $|X_{past}| \times V/\Delta X$ in the lookup table when $\Delta X > |X_{present}|$, where $X_{present}$ is a present value of the difference, $\Delta X$ is an absolute value of a change amount from the past value $X_{past}$ to the present value $X_{present}$, $|X_{past}|$ is an absolute value of the past value $X_{past}$, $|X_{present}|$ is an absolute value of the present value $X_{present}$, and V is the maximum output rate corresponding to the past value $X_{past}$.

4. The output control apparatus according to claim 2, wherein the lookup table comprises an increase table used when the output is below the output upper limit, and a decrease table used when the output exceeds the output upper limit, and
wherein the maximum output rate corresponding to the difference is lower in the increase table than the decrease table.

5. The output control apparatus according to claim 4, wherein the table update unit is configured to update the maximum output rate corresponding to a past value $X_{past}$ of the difference from V to a value smaller than $|X_{past}| \times V/\Delta X$ in the increase table when $\Delta X > |X_{present}|$ and $X_{present} < 0$, where $X_{present}$ is a present value of the difference, $\Delta X$ is an absolute value of a change amount from the past value $X_{past}$ to the present value $X_{present}$, $|X_{past}|$ is an absolute value of the past difference $X_{past}$, $|X_{present}|$ is an absolute value of the present value $X_{present}$, and V is the maximum output rate corresponding to the past value $X_{past}$.

6. The output control apparatus according to claim 2, further comprising:
an abnormality determination unit for determining whether or not there are abnormalities in the wind turbine based on a number of times that the table update unit updates the lookup table.

7. The output control apparatus according to claim 2, further comprising:
an abnormality determination unit for determining whether or not there are abnormalities in the wind turbine based on a temporal change of the overshoot amount or the undershoot amount.

8. The output control apparatus according to claim 1, wherein
the output difference calculation unit is configured to calculate a difference between the output and the upper outer-power limit of an entirety of a plurality of the wind turbines belonging to a wind farm,
the maximum output rate setting unit is configured to set the maximum output rate of the entirety of the plurality of the wind turbines belonging to the wind farm in accordance with the difference,
the output command value calculation unit is configured to calculate the output command value of the entirety of the plurality of the wind turbines belonging to the wind farm, and
the output control unit is configured to control the output of the entirety of the plurality of the wind turbines belonging to the wind farm wind turbine based on the output command value.

9. A method of controlling output of a wind turbine, comprising steps of:
calculating a difference between the output and an output upper limit of the wind turbine;
setting a maximum output rate of the wind turbine in accordance with the difference;
calculating an output command value of the wind turbine so that a rate of change of the output does not exceed the maximum output rate; and
controlling the output of the wind turbine based on the output command value,
wherein, in the step of setting the maximum output rate, the larger an absolute value of the difference is, the higher the maximum output rate is set at least in a range that the absolute value of the difference is not greater than a threshold value.

* * * * *